Dec. 24, 1957 W. D. BROWN 2,817,374
QUICK CHANGE FILLER HOPPER AND TANK COVER PLATE
Filed Oct. 23, 1956 2 Sheets-Sheet 1
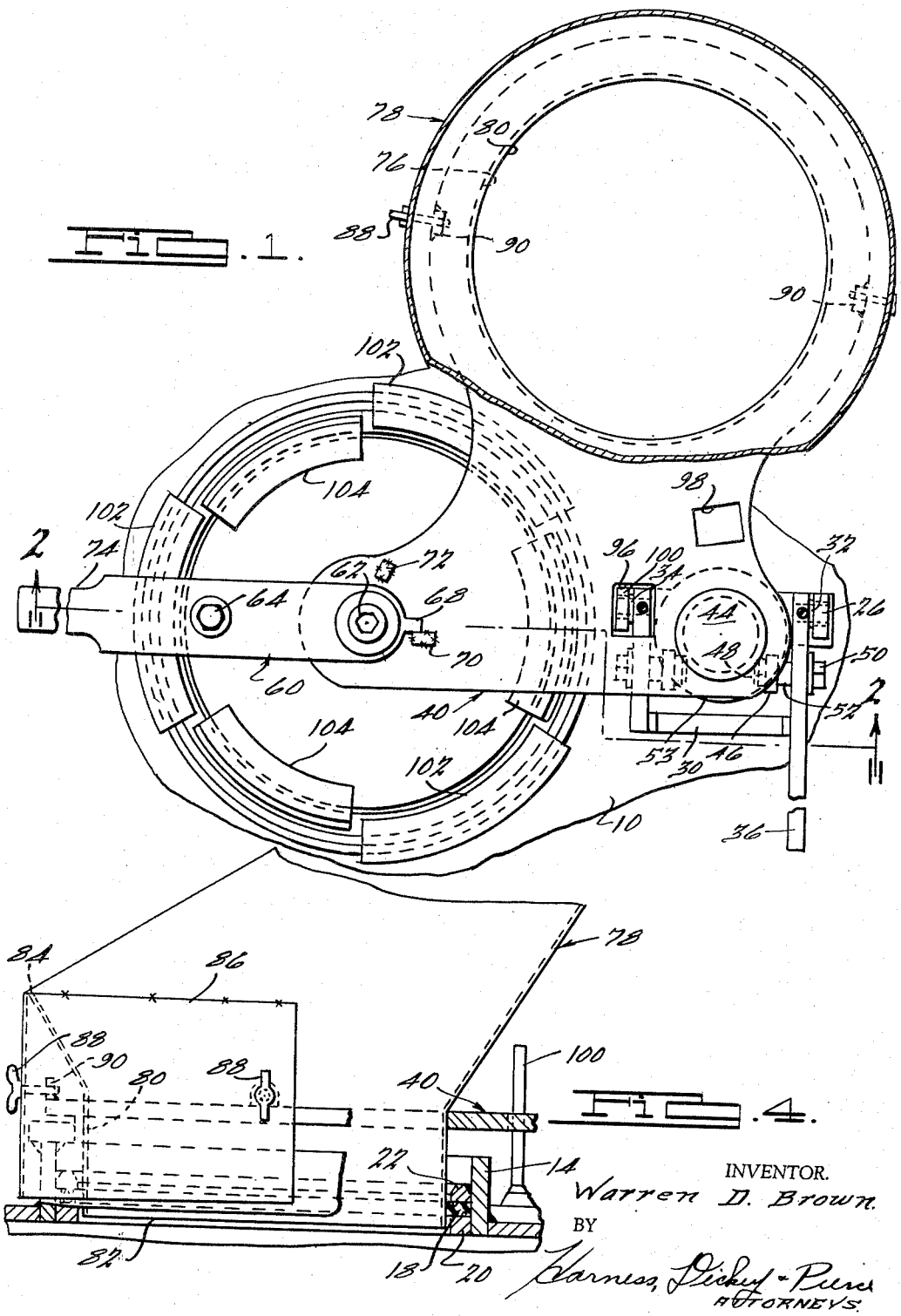
INVENTOR.
Warren D. Brown.
BY
Harness, Dickey & Pierce
ATTORNEYS Dec. 24, 1957 W. D. BROWN 2,817,374
QUICK CHANGE FILLER HOPPER AND TANK COVER PLATE
Filed Oct. 23, 1956 2 Sheets-Sheet 2
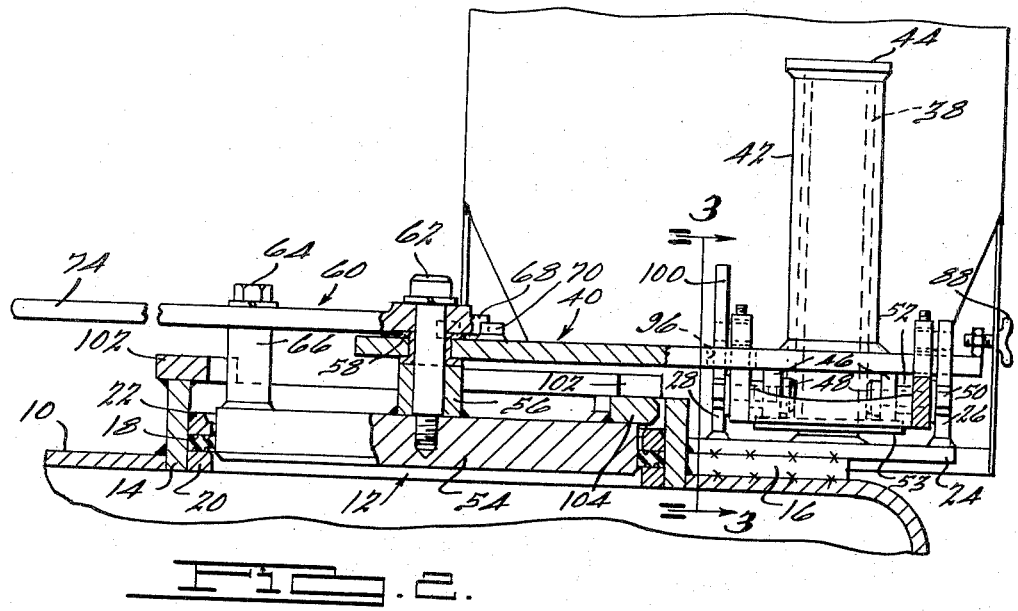
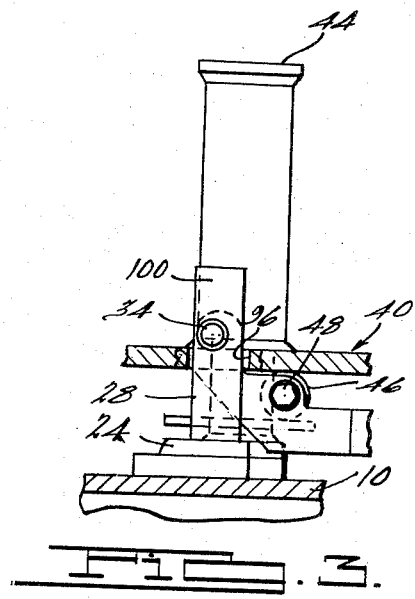
INVENTOR.
Warren D. Brown.
BY
Harness, Dickey & Pierce
ATTORNEYS.

United States Patent Office 2,817,374
Patented Dec. 24, 1957

2,817,374
QUICK CHANGE FILLER HOPPER AND TANK COVER PLATE

Warren D. Brown, Detroit, Mich.

Application October 23, 1956, Serial No. 617,794

10 Claims. (Cl. 141—342)

The present invention relates to mixing tanks and particularly to a mixing tank having an improved quick change filler hopper and tank cover plate.

It is an object of the present invention to provide an improved mixing tank which in use saves the operator a substantial amount of time in closing the tank and in positioning the hopper for filling the tank. More specifically it is an object of the present invention to provide a single unit so constructed that the operator simultaneously removes the cover plate and moves the hopper into position for loading the tank and upon completion of the loading simultaneously removes the hopper and positions the cover plate to close the tank.

It is an object of this invention to provide such an improved mixing tank incorporating a quick change filler hopper and tank cover plate which is simple in design, economical of manufacture, reliable and efficient in operation and sturdy in construction.

Also it is an object of the present invention to provide such an improved quick change filler hopper and tank cover plate in which a single handle lever serves to selectively position the hopper and cover plate in alignment with the tank filler opening and also serves to lock the cover against movement out of the tank filler opening.

Other and more detailed objects of the present invention will be readily appreciated by those skilled in the art, from a consideration of the following specification, the appended claims, and accompanying drawings, wherein:

Figure 1 is a broken plan view of apparatus embodying the present invention, showing the hopper removed for purposes of clarity and showing the cover in its closed but unlocked position;

Figure 2 is a broken sectional view of the apparatus illustrated in Figure 1, taken substantially along the line 2—2 thereof;

Figure 3 is a broken sectional view of the structure illustrated in Figure 1, taken substantially along the line 3—3 thereof, and Figure 4 is a broken view partly in section, showing the mounting of the hopper, and showing the hopper in loading position.

Referring to the drawings, the mixing tank, a portion of which is shown at 10, is provided at its top with a filler opening generally indicated at 12 and which in the preferred embodiment illustrated is formed by a cylindrical sleeve 14 which extends vertically through the tank 10 and a reinforcing plate 16 welded to the outer surface of the tank 10. An annular seal 18 is mounted within the sleeve 14 between, and extends radially inwardly of, inner and outer rings 20 and 22, respectively, which are welded to the sleeve 14. Adjacent the filler opening 12 a base plate 24 is welded to the reinforcing plate 16 and is provided with upwardly extending arms 26 and 28. A generally U-shaped pry-bar 30 has its end portions pivotally connected to the supports 26 and 28 by pivot pins 32 and 34, and is provided with an outwardly extending lever arm 36.

Intermediate the arms 26 and 28, a circular platform 53 is rigidly mounted on the base plate 24 and supports a vertically upwardly extending pivot post 38. A horizontally disposed flat carrier plate 40 is mounted on the pivot post 38 for pivotal and axial movement relative to the post 38 by a cylindrical sleeve 42 which slidably fits the post 38 and the upper end of which is closed by a plate 44. In the preferred embodiment illustrated the sleeve 42 is welded to the upper surface of the carrier plate 40 and extends vertically upwardly therefrom. The cylindrical sleeve 42 and the carrier plate 40 to which it is secured are moved vertically along the pivot post 38 by means of the U-shaped pry-bar 30 through rollers 46 which engage the under surface of the carrier plate 40 and are carried by the arms of the pry-bar 30 in spaced relation to the pivot pins 32 and 34 by which the pry-bar is pivotally supported on the arms 26 and 28. These rollers 46, which in the preferred embodiment illustrated are sealed ball-bearing units, are supported between the arms of the pry-bar 30 on studs 48, the threaded portions of which project outwardly through the arms of the pry-bar and receive fastening nuts 50. The rollers 46 are maintained in proper spaced relation on the studs 48 by spacers 52. Downward movement of the pry-bar 30 is limited by engagement of the rollers 46 with the upper surface of the platform 53 mounted on the base plate 24.

The carrier plate 40 is generally triangular and carries the upwardly extending cylindrical sleeve 42 at one corner thereof. At another corner the carrier plate 40 supports the cover plate 54 disposed below the carrier plate as shown. The cover plate 54 has a flanged bushing 56 secured to its upper surface and the upwardly extending flange of the bushing is journalled in the carrier plate 40. A thrust washer 58 encircles the bushing flange and engages the upper surface of the carrier plate 40 and the under surface of one end of a lever 60. A bolt 62 extends through the lever 60, the thrust washer 58, the sleeve bushing 56, and the carrier plate 40 and is threaded into the cover 54. The lever 60 is also secured to the cover 54 adjacent its periphery by a stud 64 threaded into a boss 66 extended upwardly from the upper surface of the cover 54.

Adjacent the inner end of the lever 60 through which the stud 62 extends, the lever 60 is provided with a projection 68 which moves between two fixed stops 70 and 72 welded to the upper surface of the carrier plate 40. The opposite end of the lever 60 provides a handle 74 which together with the handle portion 36 of the pry-bar 30 is engaged by the operator in the operation of the quick change filler hopper and tank cover plate as hereinafter described.

The third corner of the carrier plate 40 is enlarged and provided with an enlarged aperture 76 therethrough and supports the hopper 78. The hopper 78 is of generally conical construction having a cylindrical discharge neck 80 at its lower end terminating at its lower edge in a circular discharge opening 82.

The hopper is provided with an inclined upper edge affording a high back and a low loading side indicated by the reference character 84. To prevent any of the material being loaded into the hopper from going directly into the tank without passing through the screen provided in the hopper, the hopper has a guard skirt 86 extending around the front and sides of the hopper and adapted to extend downwardly over the above described sleeve 14 surrounding the filler opening 12 in the tank 10 when the hopper is in loading position. In the preferred embodiment illustrated the guard skirt 86 also serves to support the hopper 78 on the carrier plate 40. This support is effected by means of screws 88 which are rotatably mounted on the guard skirt 86 and are threaded into nuts 90 welded to the upper surface of the carrier plate 40 adjacent its periphery and around the enlarged portion in which the hopper receiving aperture 76 is formed.

To insure that the cover plate 54 and the hopper 78 will be properly aligned with the filler opening 12 when the operator desires to move the cover 54 to the closed position, or the hopper 78 to the loading position, the carrier plate 40 is provided with a pair of spaced openings 96 and 98. The support 28 upon which the end of the U-shaped pry-bar 30 which is adjacent the filler opening 12 is pivotally mounted, has an upwardly extending projection 100 which is recieved in the carrier plate opening 96 when the carrier plate 40 is positioned to align the cover plate 54 with the filler opening 12. This projection 100 is aligned with the carrier plate opening 98 when the carrier plate 40 is positioned to align the discharge neck 80 at the lower end of the hopper 78 with the filler opening 12.

The cover 54 is provided with a breach block type locking means which consist of three angularly spaced arcuately shaped plates 102 which are secured to the upper edge of the sleeve 14 and extend radially inwardly thereof. Between the plates 102 are three equiangularly disposed spaces through which may be moved three other arcuately shaped plates 104 secured to the upper surface of the cover 54. When the arcuate plates 104 carried by the cover 54 have been moved below the arcuate plates 102 carried on the sleeve 14, the cover 54 may then be rotated by the engagement of the handle 74 on the lever 60 to move the arcuate plates 104 directly beneath the arcuate plates 102 and thereby prevent movement of the cover 54 axially outwardly of the filler opening 12.

The operation of the above described quick change filler hopper and tank cover plate will now be described. Starting with the cover in the closed and locked position it will be appreciated that the lever 60 is disposed with the projection 68 engaging the stop 72. To move the arcuate plates 104 carried by the cover 54 from alignment with the arcuate plates 102 carried on the sleeve 14 the operator by engaging the handle 74 turns the lever 60 in a clockwise direction as viewed in the drawing until the projection 68 engages the stop 70. The cover is now unlocked and the operator may now engage the handle 36 of the pry-bar 30 to raise the carrier plate 40 and lift the cover 54 out of engagement with the seal 18 and clear of the filler opening 12 and its surrounding structure comprising the sleeve 14 and the plates 102 on the outer edge thereof. During this raising of the carrier plate 40 the pry-bar 30 pivots about the pivot pins 34 and the rollers 46 press upwardly on the under side of the carrier plate 40 causing it and the sleeve 42 through which it is mounted on the pivot post 38, to move axially outwardly of the pivot post 38. When the carrier plate 40 has been raised sufficiently to withdraw the upwardly extending projection 100 from the aperture 96 in the carrier plate, the operator may then, by operation of the handle 74, move the lever 60 in a counterclockwise direction until the projection 68 on its inner end engages the stop 72 after which continued movement of the lever 60 will cause the entire carrier plate assembly, including the cover and hopper carried thereby, to pivot in a counterclockwise direction about the post 38. When the aperture 98 in the carrier plate 40 is aligned with the projection 100 on the support member 28, the operator may then lower the pry-bar handle 36 permitting the carrier plate to move downwardly until the rollers 46 are again supported upon the platform 53 which limits downward movement of the carrier plate 40. During this lowering of the carrier plate 40 the discharge neck 80 of the hopper 78 moves downwardly into the filler opening 12 to a position in which the discharge opening 82 at the lower end of the discharge neck 80 is disposed below the seal 18 in the filler opening 12. This prevents any of the materials passing through the hopper from contaminating the sealing ring 18 and interfering with obtaining a proper seal when the above described operation is reversed and the cover plate 54 is returned to its closed position.

The improved quick change filler hopper and tank cover plate of the present invention readily lends itself to various types of operation. The hopper may be provided with a gate mechanism in its discharge neck so that the hopper may be filled while the cover is in its closed position. Also apparatus of this invention may readily be used with equipment having two tanks by disposing the hopper and the cover at opposite sides of the pivot post so that the hopper is in loading position for one tank while the cover is in closed position for the other tank. The apparatus could also readily be used with two tanks by providing a second cover plate mounted at an equal angle relative to and on the opposite side of the hopper thus permitting the carrier plate to oscillate between a first position in which the hopper and one cover plate are in use and a second position in which the hopper and the other cover plate are in use.

While only one specific embodiment of the invention has been illustrated and described herein, it will be readily appreciated by those skilled in the art that numerous modifications and changes may be made without departing from the spirit of the present invention.

What is claimed is:

1. In an apparatus for mixing materials, a mixing tank having a filler opening, a pivot post mounted in fixed relation to said opening, a carrier plate mounted on said post for pivotal and axial movement relative thereto, a cover mounted on said carrier plate and adapted to close said opening, a hopper mounted on said carrier plate in spaced relation to said cover and having a discharge opening adapted to be aligned with said filler opening, and means for moving said carrier plate pivotally and axially of said pivot post to selectively close said filler opening with said cover and align said discharge opening with said filler opening.

2. In an apparatus for mixing materials, a mixing tank having a filler opening and a sealing surface surrounding said opening, a pivot post mounted in fixed relation to said opening, a carrier plate mounted on said post for pivotal and axial movement relative thereto, a cover mounted on said carrier plate and movable therewith to a closed position in which it engages said sealing surface and closes said opening, a hopper having a discharge opening mounted on said carrier plate in spaced relation to said cover and movable therewith to a loading position in which said discharge opening is aligned with said filler opening and disposed inwardly of said sealing surface, and means for moving said carrier plate to selectively move said cover to said closed position and said hopper to said loading position.

3. The combination of claim 1 wherein said cover is rotatable between a locked and an unlocked position and said last named means includes a lever mounted on said carrier plate for pivotal movement relative thereto between fixed limits for rotating said cover between said locked and unlocked position, said lever being operable when at said fixed limits for pivoting said carrier plate about said pivot post.

4. In an apparatus for mixing materials, a mixing tank having a short cylindrical filler opening having its axis vertically disposed, said mixing tank having an annular seal around said filler opening, a vertically disposed pivot post mounted in spaced relation to the axis of said filler opening, a carrier plate mounted on said post for pivotal and axial movement relative thereto, a cover mounted on said carrier plate and movable therewith to a closed position in which said cover is received in said filler opening and engages said seal, a hopper having a discharge neck having a discharge opening at its lower end, said hopper being mounted on said carrier plate and movable therewith to a loading position in which said discharge neck projects into said filler opening and said discharge opening is disposed below said seal, and means for moving said carrier plate pivotally and axially relative to said pivot post to selectively move said cover to said closed position and said hopper to said loading position.

5. The combination of claim 1 wherein said last named means includes a prybar for moving said carrier plate axially of said post and a handle for pivoting said carrier plate about said post.

6. The combination of claim 1 wherein said filler opening and said cover are circular and said cover is rotatable relative to said carrier plate, said tank and said cover having cooperating means adapted upon rotation of said cover to a locked position when said cover is disposed to close said filler opening to prevent movement of said cover axially of filler opening, said last named means including a pair of stops on said carrier plate and a lever secured to said cover for rotation therewith and adapted to engage said stops, said lever being operable between said stops for rotating said cover to and from said locked position and being movable when engaging said stops for pivoting said carrier plate about said post.

7. In an apparatus for mixing materials, a mixing tank having a filler opening, a pivot post mounted in fixed relation to said filler opening, a carrier plate mounted on said post for pivotal and axial movement relative thereto, a cover mounted on said carrier plate and adapted to close said filler opening, a hopper having a discharge opening and mounted on said carrier plate, said filler opening, said cover and discharge opening being equidistant from said post, said carrier plate being movable pivotally of said post between a first position in which said cover is aligned with said filler opening and a second position in which said discharge opening is aligned with said filler opening, means for moving said carrier plate axially of said post between a raised position and a lowered position when said carrier plate is in said first position and when said carrier plate is in said second position, means preventing said axial movement of said carrier plate from said raised position to said lowered position when said carrier plate is in positions other than said first and second positions.

8. The combination of claim 2 including a projection mounted on said tank and extending parallel to said post, said carrier plate having a first aperture adapted to fit over said projection when said cover is in said closed position and a second aperture adapted to fit over said projection when said hopper is in said loading position.

9. In an apparatus for mixing materials, a mixing tank having a filler opening, a pivot post mounted in fixed relation to said opening, a carrier plate mounted on said post for pivotal and axial movement relative thereto, a cover mounted on said carrier plate and movable therewith to a closed position in which it closes said filler opening, a hopper having a discharge opening and movable in response to movement of said carrier plate to and from a loading position in which said discharge opening is aligned with said filler opening for discharging material from said hopper through said filler opening into said mixing tank, and means for moving said carrier plate pivotally and axially of said pivot post to selectively move said cover to said closed position and said hopper to said loading position.

10. In an apparatus for mixing materials, a mixing tank having a short cylindrical filler opening having its axis vertically disposed, said mixing tank having an annular seal around said filler opening, a vertically disposed pivot post mounted in spaced relation to said axis of said filler opening, a carrier plate mounted on said post for pivotal and axial movement relative thereto, a cover mounted on said carrier plate and movable therewith to and from a closed position in which said cover is received in said filler opening and engages said seal, a hopper having a discharge neck having a discharge opening at its lower end, said hopper being movable to and from a loading position in response to said pivotal movement of said carrier plate, said carrier plate, said cover and said hopper being constructed and arranged so that when said hopper is in said loading position material may be discharged from said discharge opening through said filler opening into said mixing tank, and means for moving said carrier plate pivotally and axially relative to said pivot post to selectively move said cover to said closed position and said hopper to said loading position.

No references cited.